J. A. McLANE.
FOOD CONTAINER.
APPLICATION FILED OCT. 8, 1917.

1,332,508.

Patented Mar. 2, 1920.

Witness
J. M. Fowler Jr.
A. M. Rose

Inventor
Joseph A. McLane
By W. A. Redmond
Attorney

UNITED STATES PATENT OFFICE.

JOSEPH A. McLANE, OF MORGANTOWN, WEST VIRGINIA.

FOOD-CONTAINER.

1,332,508.  Specification of Letters Patent.  Patented Mar. 2, 1920.

Application filed October 3, 1917. Serial No. 195,355.

*To all whom it may concern:*

Be it known that I, JOSEPH A. McLANE, a citizen of the United States, and resident of Morgantown, in the county of Monongalia and State of West Virginia, have invented new and useful Food-Containers, of which the following is a specification.

My invention relates to an improved article of manufacture consisting in a food container wherein the food is preserved and maintained intact at a desired temperature for a considerable period of time. This container enables food, such as cream, milk, ice-cream and other perishable food products, to be maintained for some time in their original condition, especially at a desired temperature, so that it will not spoil in any way or be injuriously affected.

My invention involves in its embodiment an article of manufacture consisting of an efficient and cheap container, which, having performed its function as a preserving, cooling and transporting container is on the opening of said vessel to remove the ice-cream, milk, cream or other easily perishable food products, rendered inactive, thus avoiding the re-use of the vessel by the consumer, which may, however, be readily made effective again for its purpose by the manufacturer or his agent.

My container which, as an article of manufacture, is efficient, and commercially practical, particularly because it is cheap, enables a manufacturer or seller of ice-cream and other food products, such as cream or milk, to send his food product to a relatively distant point cheaply and yet efficiently, thus, rendering practical in these days of strong commercial competition, the sale of a relatively perishable food product over a wide area at relatively cheap rates, and yet preserving said product intact as to condition, composition and temperature.

Figure 1:
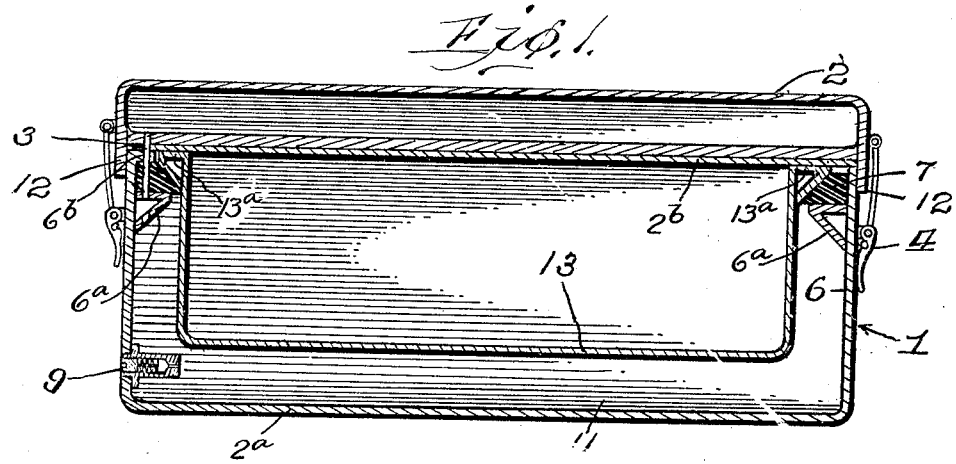

Turning now to the drawings which form part of my specification,

Figure 1 represents a longitudinal section of my improved food container.

Figure 2:
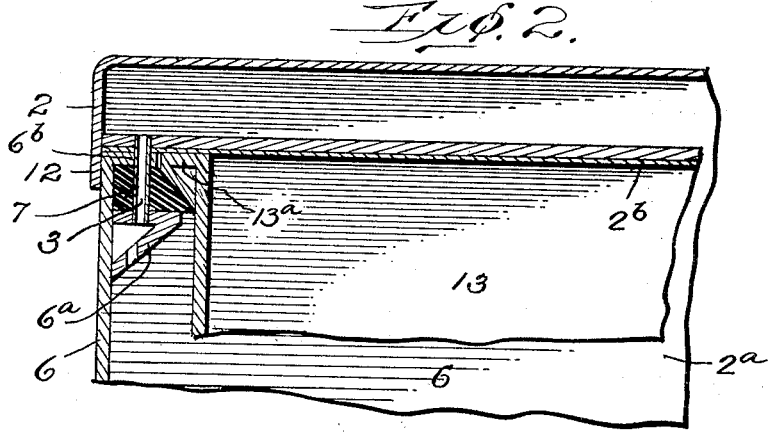

Fig. 2 an enlarged illustration of certain important details thereof.

My container consists of a vacuum insulated receptacle generally designated 1, composed of two parts, viz., a vacuum heat insulated cover 2 either hinged to or connected with, in any appropriate way, the lower or body part $2^a$, of said containing vessel, which part $2^a$ is also heat insulated by a vacuum space or intervening chamber 11. The cover 2 is (as stated) fastened to the body $2^a$, by a spring latch 4, or a hinge, or in any other desired way, and the cover 2 has extending downwardly therefrom flanges 12, which fit tightly over the upper edge of the body. The body $2^a$, of the container is composed of an inner and an outer vessel between which is formed a vacuum space 11 for heat insulating purposes. The inner vessel, 13, of the body of the container is preferably composed of metal which may be lined with porcelain or glass or contain a paper receptacle to receive the ice-cream or other products. The outer part 6 of the body is composed of metal or any other desired substance, such as fiber, papier mâché, rubber or any other similar material. The inner vessel 13 is placed in the outer vessel and is provided with an outwardly projecting supporting flange, or abutment $13^a$ which rests on and is supported by a corresponding inwardly projecting flange, or abutment, $6^a$ provided on the outer vessel 6. A separator or gasket 7 is interposed between said flanges and enables the parts 13 and 6 to be firmly brought together in air-tight relationship when the top 2 is fastened down on the body of the containing vessel 1. One face of the gasket 7, which is of a heat non-conducting or retardant material, is chamfered, as shown, and the flanges $6^a$ and $13^a$ are to rest on said face and to be of such length as to maintain the vessels 6 and 13 out of contacting relation and thereby prevent the outer vessel 6 from transmitting the atmospheric temperature to the walls of the inner vessel 13. By this construction and arrangement the efficiency of the container is greatly increased.

At one or more points, small communicating brass or other metallic pipes, 3, are inserted or placed as shown, so as to make a communication between the vacuum space of cover 2 and vacuum space of 11, said pipes, 3, passing through the rubber separator or gasket 7, thus causing the air space or more properly the vacuum space of 2 to be in free communication with the air space of 11. The pipe 3 may be further retained in position by passing the same through inturned tongues or lips 6ᵇ on the vessel 6, and they are to register with ports or openings in the cover 2 and flange 6ᵃ, as shown. At any desired point, for instance, as shown in the lower part of the outer containing vessel, 6, is a check valve 9 of appropriate type at which point is connected the pipe of the air pump to exhaust the communicating vacuum chambers of 2 and 2ᵃ. Moreover a sheet of suitable heat retardant material 2ᵇ, such as rubber, asbestos or the like is arranged across the top of the body 2ᵃ, or it may be secured to the under face of the cover 2, in order to rest on the upper edges of the body for the purpose of completely insulating the inner vessel 13 from the cover 2, and, further, to make an air tight joint between the interior of the vessel 13, the cover 2 and the vacuum chambers. The effect of this construction is primarily, among others, that the moisture and air within the vessel 13, or contained within the food in said vessel, will not be extracted when the air is exhausted from the vacuum chambers. This is of great importance because ice-cream, for instance, has a large percentage of air therein, which if extracted would materially reduce its bulk and otherwise injure it. This is, also, equally true with other foods. It is apparent that when 2 is lifted from the lower part of the containing vessel 11, that the vacuum is broken and the vessel rendered incapable of further use without the use of suction air pumps, thus preventing the unauthorized use of the vessel again, and thus avoiding the possible sale of inferior products in the labeled receptacle of a high class firm. Moreover, it is evident that when the inner vessel 13 is lifted away from the outer vessel 6, the vacuum is still more completely broken.

In view of the fact that such a container can be made cheaply, that it is of relatively small size with relation to its containing capacity, that it does not involve the added weight due to the cooling medium such as ice, and still has all the advantages of the more highly expensive vacuum containing vessels, such as the thermos container or bottle, perishable products can be preserved, transported and maintained at a desired temperature for some time, such as twenty-four to thirty-six hours, it is plain that a manufacturer or distributer of food products can obtain a much wider market for his products, due to the cheap efficient and easily transported containing vessel for food products herein set forth.

I do not, of course, limit myself as to the size, shape or material or use of my containing vessel, since its characteristic features are a cheap structure, an efficient heat insulating vacuum and the prevention of further unauthorized use after the container has left the hands of a manufacturer or seller of a food product, and has been received by the consumer thereof.

Having thus described my invention, what I claim is:

1. An article of manufacture comprising a container for perishable food having a food receiving chamber therein, and further having a heat insulating vacuum chamber in the walls thereof and a heat insulating vacuum chamber in its cover, an air communicating means between the two vacuum chambers, and an air exhausting valve mounted on one of the vacuum chambers, said food receiving chamber being sealed against extraction of air during exhaustion of air from the vacuum chambers.

2. An article of manufacture comprising a container for perishable food composed of a vessel and a cover therefor, both having a vacuum chamber thereabout and said vessel having a food containing part, and an air exhausting valve mounted on one of the vacuum chambers, said vacuum chambers being adapted to communicate when the cover is closed, and to break the vacuum when open, the containing part of said vessel being sealed against extraction of air during exhaustion of air from the vacuum chambers.

3. An article of manufacture comprising a container for perishable food having a cover and a containing part, the latter having a vacuum chamber thereabout which is closed and maintained sealed by the cover when closed, and means whereby said chamber may be exhausted of air, said containing part being sealed against extraction of air during exhaustion of air from the vacuum chamber.

4. A container of the kind described comprising an outer vessel having an inwardly extending abutment provided with a relatively soft heat insulating gasket thereon, an inner food containing vessel disposed in said outer vessel, said inner vessel having an outwardly extending abutment to rest on said gasket, thereby wholly insulating the inner vessel from the outer vessel, and a cover for the container having a heat insulating lining on its inner face, thereby insulating the cover from the inner vessel.

5. A container of the kind described comprising a vessel having an inwardly extending flange or shoulder therein arranged below the open edge thereof, a heat insulating gasket of relatively soft material on the flange, a tubular member extending through the gasket and flange and having an upwardly projecting end, an inner vessel disposed in said outer vessel and out of contact therewith to form an intervening air space, said inner vessel having an outwardly extending flange or shoulder arranged adjacent the open edge thereof to rest on said gasket, a cover for the container having an air space therein, and an opening through which the projecting end of said tube extends to communicate said air spaces when the cover is closed, a heat insulating and relatively soft lining coextensive with the inner face of the cover, and means for forcing the cover down on the edges of the vessels and maintaining the container closed, whereby the parts are firmly held in place and a tight joint made.

6. A container of the kind described comprising an outer vessel, an inner vessel within the outer vessel and out of contact therewith to form an intervening air space, heat-insulating means between said vessels and adapted to maintain the inner vessel in position within said outer vessel and to wholly insulate the inner vessel from the outer vessel, and a cover for the container insulated from the inner container.

In testimony whereof, I affix my signature in the presence of two witnesses.

JOSEPH A. McLANE.

Witnesses:
ADAH M. ROSE,
E. J. REDMOND.